United States Patent Office 3,433,838
Patented Mar. 18, 1969

3,433,838
PURIFICATION OF PERHALOACETONES
William J. Cunningham, Somerset, and Cyril Woolf, Morris Township, Morris County, N.J., assignors to Allied Chemical Corporation, New York, N.Y., a corporation of New York
No Drawing. Continuation-in-part of application Ser. No. 297,220, July 24, 1963. This application Sept. 21, 1966, Ser. No. 580,860
The portion of the term of the patent subsequent to Mar. 19, 1985, has been disclaimed
U.S. Cl. 260—593                    22 Claims
Int. Cl. C07c 45/24, 49/08

ABSTRACT OF THE DISCLOSURE

Perhaloacetones in crude reaction masses containing the same are purified by contacting the crude reaction masses with liquid phase water in an amount equivalent to at least one mole of water per mole of perhaloacetone, while maintaining temperature such that any free water present is in liquid phase to form a purified reaction mass from which water can then be eliminated to form anhydrous, purified perhaloacetone. The elimination of water can be accomplished by dehydration with a suitable desiccating agent or by dehydration to monohydrates which, upon heating, disassociate to form the corresponding trihydrates and anhydrous perhaloacetones.

---

This application is a continuation-in-part of copending application of William J. Cunningham and Cyril Woolf, entitled, "Fluoro Compounds and Synthesis Thereof," Ser. No. 297,220, filed July 24, 1963, now abandoned, which latter application is in turn a continuation-in-part of copending application of Cyril Woolf and William J. Cunningham, entitled, "Fluoro Compounds and Processes for Making Same," Ser. No. 263,430, filed Mar. 7, 1963, now abandoned.

This invention relates to methods for purifying a perhaloacetone selected from the group consisting of hexafluoroacetone (6FK), monochloropentafluoroacetone (5FK) and mixtures thereof.

6FK is a known compound which is gaseous under normal conditions, has a boiling point of minus 27° C. and a melting point of about minus 129° C. It may be prepared by known processes and is of known utility, e.g. it has been used to prepare the hexafluoro-bisphenol A compound,

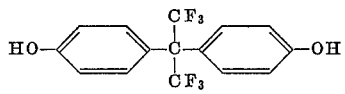

which has been converted to fluorine-containing polycarbonate resin.

Likewise, 5FK is a known compound, gaseous under normal conditions, has a boiling point of plus 8° C. and a melting point of minus 1–3° C. 5FK may be prepared by known processes and is of known utility, such as when hydrolyzed by treatment with strong alkali at moderately low temperatures yields the alkali metal salt of trifluoroacetic acid, which when acidified with sulfuric acid produces $CF_3COOH$, a commercial product.

5FK and 6FK, hereinafter referred to as "the subject FK's," may be prepared by the reaction of hexachloroacetone with HF in the presence of catalysts, such as chromium oxides. Such procedures are described more in detail, for example, in U.S.P. 3,164,637 to Henry R. Nychka and Cyril Woolf.

In such catalyzed reactions of hexachloroacetone with HF, conditions can be controlled, somewhat, to favor production of either 5FK or 6FK. Complete conversions, however, to 5FK or 6FK, to the exclusion of the other, are usually not possible, particularly in one-pass operations, and the crude perhaloacetone reaction mass will normally contain quantities of both 5FK and 6FK.

Because of the widely separated boiling points of 5FK (+7.8° C.) and 6FK (−27.4° C.), the subject FK's may readily be separated from one another by ordinary physical means, such as fractional distillation.

Other substances, however, which are inevitably present as impurities in crude perhaloacetone reaction masses, such as obtained by the above mentioned preparative route, cannot be readily separated from the crude perhaloacetone reaction mass due to the fact that they form complexes and azeotropic systems with the subject FK's, which must be broken before separation is feasible. Such substances include unreacted HF and by-product HCl.

Some of the complexes which are believed to be formed between these substances and the subject FK's include the following:

(1) Hexafluoro-2-chloroisopropanol, M.P. −47° C., decomposition point 19° C., from 6FK and HCl.

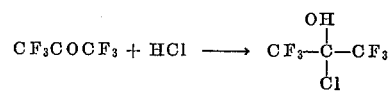

(2) Heptafluoroisopropanol, M.P. − 56° C., decomposition point about 14–16° C., from 6FK and HF.

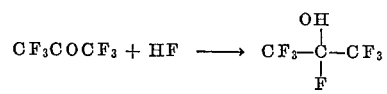

(3) 1-chlorohexafluoroisopropanol, M.P. −82° C., decomposition point about 32–33° C., from 5FK and HF.

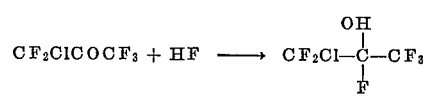

(4) 2 - (1-chlorohexafluoroisopropoxy)-1-chloropentafluoroisopropanol, B.P. −1° C., from 5FK and HF.

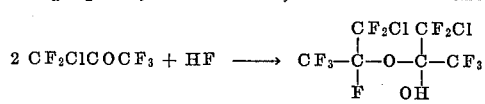

When it is attempted to distill crude perhaloacetone reaction masses containing the subject FK's, HCl and/or HF, the above noted complexes occur in forecuts, intermediate cuts and even in the distillation residue. Accordingly, HCl and HF have not been considered to be constituents which are volatilizable from mixtures with the subject FK's.

Other contaminants include organic by-products such as phosgene and halocarbons, e.g. $CF_2ClCFCl_2$ and $CF_2ClCF_2Cl$. Some of the organic by-products boil at temperatures too close to the boiling points of the subject FK's to permit effective separation therefrom by fractional distillation and accordingly have not been considered to be volatilizable from the subject FK's.

We have found that the subject FK's may be effectively purified from crude perhaloacetone reaction masses, such as described above, essentially by contacting the crude reaction mass with liquid-phase water in amount equivalent to at least one mole of $H_2O$ per mole of perhaloacetone to form a reaction mass comprising recoverable perhaloacetone·$xH_2O$, wherein $x$ is a whole number from one to three and, eliminating $H_2O$ from at least a portion of such purified reaction mass.

It has been found that water breaks down perhaloacetone complexes of the type indicated above and, at the same time, releases trapped quantities of HCl, HF and organic materials. Rupture of the complexes takes place in favor of stable or unstable perhaloacetone·$xH_2O$ compositions which are formed, or when reaction masses containing recoverable perhaloacetone·$xH_2O$ compositions are formed.

Since impurities are evolved off upon formation of the subject FK·$xH_2O$ compositions or upon formation of reaction masses from which such compositions are recoverable; the reaction mass obtained by the reaction of the subject FK's with $H_2O$ will be referred to as "the purified reaction mass."

The term "recoverable perhaloacetone·$xH_2O$ composition" refers to a reaction mass which is formed between one or both of the subject FK's and water which contains an amount of water which is in excess of that required to form a stable or unstable perhaloacetone·$xH_2O$ composition. 5FK and 6FK, for example, form unstable solid monohydrates (5FK·$H_2O$ and 6FK·$H_2O$) and also form stable constant boiling compositions corresponding to 5FK·$3H_2O$ and 6FK·$3H_2O$.

5FK·$H_2O$ is an unstable, white crystalline solid having a melting point of about 26.0–26.5° C. It disassociates at temperatures above about 40° C. to form 5FK·$3H_2O$ and 5FK.

6FK·$H_2O$ is also an unstable, white crystalline solid and has a melting point of about 40° C. It disassociates at temperatures above about 40° C. to form 6FK·$3H_2O$ and 6FK.

$CF_3COCF_3$·$3H_2O$ is a constant boiling, water-white liquid at atmospheric pressure, boiling at about 105° C. It has been reported in the literature as a hydrate of $CF_3COCF_3$. A. T. Morse et al. in Canadian Journal of Chemistry, vol. 33, No. 3 (March 1955), p. 456, disclose it as "hexafluoroacetone hydrate, B.P. 55–56° C. at 80 mm." Chemical Abstracts, vol. 54 (1960), 20841a, disclose it as "perfluoroacetone hydrate, B.P. 50°". Henne et al. in Journal of the American Chemical Society, vol. 72 (1950), p. 3578, disclose it as $CF_3COCF_3$ hydrate, B.P. 57° at 93 mm.

Strictly speaking, a hydrate is a true compound. The art has, however, used this term loosely to describe compositions which are not true compounds but which behave in some respects as true compounds, such as by exhibiting a constant boiling point.

$CF_3COCF_3$·$3H_2O$ exhibits many properties characteristic of a true compound. Recent study of the freezing characteristics of this composition has, however, indicated that $CF_3COCF_3$·$3H_2O$ is in fact not a true compound but is a constant boiling distillable mixture satisfying the empirical formula $CF_3COCF_3$·$3H_2O$. To facilitate expression and to be consistent with the prior art terminology for the constant boiling mixture of $CF_3COCF_3$ and three (3) moles of $H_2O$, this composition will be referred to herein as a hydrate and, more particularly, as the trihydrate of $CF_3COCF_3$.

$CF_3COCF_2Cl$·$3H_2O$ is a constant boiling, water-white liquid at atmospheric pressure, boiling at about 105° C. and also will be referred to as a hydrate.

5FK·$H_2O$ and 6FK·$H_2O$ form liquid slurries with excess water, provided that the molar excess of $H_2O$ does not amount to or exceed about two. The monohydrates are recoverable from such liquid slurries by eliminating a sufficient quantity of $H_2O$ so as to provide an FK/$H_2O$ molar ratio of about 1:1. When the molar excess of $H_2O$ amounts to two, the corresponding trihydrates (5FK·$3H_2O$ and 6FK·$3H_2O$) are formed. With further excesses of $H_2O$, the trihydrates are solubilized and are in ionic form in solution. The trihydrates are not identifiable in such form but are formed and are recoverable by distillation of the solution. It was particularly surprising to find that $H_2O$ possesses the ability to free halogen acids, for example, from their complexes with the subject FK's, in view of the fact that it is known that $H_2O$, itself, forms azeotropes with HCl and HF, the boiling points of which azeotropes (110° C. and 120° C., respectively) are higher than the decomposition temperatures of the various perhaloacetone hydrates.

In addition to the quantities of halogen acids and organic materials which are released from crude perhaloacetone reaction masses, during the formation of hydrates to form the purified reaction masses; further quantities of such impurities are volatilizable from the purified reaction masses. This may be accomplished by heating the purified reaction masses to just below about 105° C. at atmospheric pressure. At temperatures above this level the FK trihydrates decompose and can result in loss of desired FK product. Purified reaction masses comprising the unstable monohydrates break down upon heating to form the stable trihydrates and the derivative FK's and thus, heating such reaction masses serves the dual function of volatilizing off volatilizable impurities and eliminating at least a portion of the water from the purified reaction mass.

Still further quantities of impurities, particularly halogen acids and especially HCl, which are not removed by the above procedures, may be removed from the monohydrates by simple physical procedures, such as by pumping under vacuum or by flushing with an inert gas, such as nitrogen.

The monohydrates of 5FK and 6FK may be converted into the corresponding trihydrates by the addition of liquid-phase water or by disassociation, as described more in detail hereafter, and the trihydrates may be converted into the corresponding monohydrates by the addition of the corresponding anhydrous FK or by the elimination of $H_2O$ such as by means of a desiccating agent. Similarly, $H_2O$ may be partially or completely eliminated from reaction masses containing recoverable hydrates by use of a desiccating agent.

In accordance with the embodiments of the broader aspects of the invention, the purification process comprises contacting a crude reaction mass containing hexafluoroacetone, monochloropentafluoroacetone, or a mixture thereof, with liquid-phase water in amount equivalent to at least one mole of $H_2O$ per mole of perhaloacetone, while maintaining temperature such that any free water present is in liquid phase, to form a purified reaction mass comprising recoverable perhaloacetone·$xH_2O$, wherein $x$ is a whole number from one to three; eliminating $H_2O$ from at least a portion of the purified reaction mass, and recovering anhydrous, purified perhaloacetone.

The term "free water," as used herein, refers to $H_2O$ which is available for reaction with further FK and is not tied up with FK as water of constitution of FK·$H_2O$.

The term "liquid-phase water" contemplates the use of $H_2O$ per se, or as the water of constitution of a perhaloacetone hydrate.

In one embodiment, the amount of liquid-phase water contacted with the FK containing crude reaction mass is an amount which is required to form FK·$xH_2O$, wherein $x$ is a whole odd number from one to three. In another embodiment the total amount of liquid-phase water which is employed is that required to form perhaloacetone·$2H_2O$.

Reaction of the subject FKs with $H_2O$ is exothermic. Reaction temperature may be controlled by regulation of rate of introduction of 6FK into the desired amount of $H_2O$ or by other suitable means. While, without detrimental results, at atmospheric pressure reaction temperatures may be maintained within the range of 5–80 C., reaction temperatures in the range of 15–60° C. are usually preferred.

In a preferred embodiment, additional quantities of impurities are removed from the purified reaction masses by heating such masses to volatilize therefrom volatile constituents which boil below about 105° C. at atmospheric pressure. Still preferably, the purified reaction masses which are subjected to the volatilization treatment comprise 5FK·$H_2O$, 6FK·$H_2O$, or mixtures thereof. In this embodiment, the volatilization treatment simultaneously effects disassociation of the monohydrates to the corresponding trihydrates and FK's and thus obviates the requirement for a separate and distinct dehydration step. If desired, of course, the trihydrates produced by the disassociation of the monohydrates may be dehydrated directly to the corresponding FK's, as described above. Otherwise, the trihydrates may be recycled and used as the source of liquid-phase water to produce further quantities of monohydrates.

Elimination of $H_2O$, as indicated above, may be accomplished by disassociation of the perhaloacetone monohydrates or dihydrates to the corresponding trihydrates and perhaloacetones. $H_2O$ may be eliminated partially or completely from all the perhaloacetone hydrates or reaction masses containing recoverable perhaloacetone hydrates by dehydration with a desiccating agent, such as conc. $H_2SO_4$, $P_2O_5$ and $SO_3$. The preferred desiccating agent is conc. (80–99%) $H_2SO_4$. The dehydration step is preferably carried out at temperatures above the boiling point of the 5FK and 6FK material involved (7.8° C. and −27.4° C., respectively). The preferred temperature operating range for the dehydration step is between about 60–80° C.

For convenience of illustration, the invention will be further described mostly in connection with processes for purifying 6FK.

To carry out one embodiment of the first step of the subject purification process, i.e., formation of $6FK \cdot 3H_2O$, the crude reaction mass, containing 6FK, is preferably introduced into the amount of water required to form the $6FK \cdot 3H_2O$. While the 6FK containing reaction mass may be charged in gas form into the water, for operational convenience, the gases may be condensed and introduced as liquid into the water.

In another embodiment of the hydrate forming step, it has been found that at temperatures at which water is maintained in liquid phase, a given quantity of water will absorb and react with 6FK in amounts of the latter up to approximately equivalent to one mole of 6FK per mole of $H_2O$. Hence, in circumstances where 6FK is introduced into liquid water, reaction between 6FK and $H_2O$ continues until the amount of 6FK charged is slightly more than equivalent to about one mole proportion of 6FK per mole of $H_2O$ charged. Thereafter any further quantity of 6FK introduced passes off as an unreacted gas. At this stage, if reaction temperature is held appreciably below about 40° C. there is formed in the contacting vessel a somewhat moist but relatively solid mass of relatively long, needle-like crystals found to be the monohydrate, $6FK \cdot H_2O$, a material which melts at about 40° C. If a more purified product is desired, the material may be gently heated just below or at about 40° C. to drive off the slight excess of ketone.

If desired, the solid $6FK \cdot H_2O$ may be added to enough water to form the liquid $6FK \cdot 3H_2O$.

Alternatively, $6FK \cdot 3H_2O$, as well as 6FK, may be recovered from the $6FK \cdot H_2O$ by disassociation. This embodiment is based on the discoveries that $6FK \cdot H_2O$, on heating, disassociates to 6FK and $6FK \cdot 3H_2O$ in accordance with $3(6FK) \cdot H_2O \rightarrow 2(6FK) + 6FK \cdot 3H_2O$, the same reaction being applicable to $5FK \cdot H_2O$. To effect recovery of $6FK \cdot 3H_2O$ from $6FK \cdot H_2O$, for example, the $6FK \cdot H_2O$ may be placed in an ordinary heating pot or vessel. On application of heat to the pot, at temperature of about 40° C., the monohydrate, if initially solid, melts. On further heating and raising of temperature, 6FK is evolved, and on continued heating at temperature and for a time interval enough to vaporize all constituents boiling at temperature below about 105° C., there remains in the pot a solution constantly boiling at about 105° C. and consisting of liquid $6FK \cdot 3H_2O$.

It should be noted that $6FK \cdot 3H_2O$ may readily be formed and recovered from a reaction mass comprising 6FK and any proportion of $H_2O$ by heating the reaction mass to volatilize therefrom volatile constituents which boil below 105° C. at atmospheric pressure. If less than a 3:1 molar ratio of $H_2O/6FK$ is present, any solid $6FK \cdot H_2O$ or liquid $6FK \cdot H_2O$ [1] which may have been formed, is disassociated to $6FK \cdot 3H_2O$. If greater than a 3:1 molar ratio of $H_2O/6FK$ is present, the reaction mass is fractionally distilled to form a constant boiling liquid solution, boiling at about 105° C. at atmospheric pressure. Water in excess of three molar proportions will distill off, causing $6FK \cdot 3H_2O$ to be formed.

In a preferred embodiment, as noted above, $6FK \cdot 3H_2O$ is used as the source of liquid-phase water to form a lower hydrate. In this embodiment a gas stream comprising crude 6FK may be passed into the liquid trihydrate at temperatures indicated hereinbefore. 6FK absorbs out of the gas, with gaseous impurities passing through, until a lower hydrate is formed. The reaction can be continued until the monohydrate is formed or until any "hydrate" of the formula $6FK \cdot >1<3H_2O$ is formed. Due to the length of time required to form $6FK \cdot H_2O$, for commercial operation, it is preferred to form $6FK \cdot 2H_2O$ and recover the anhydrous, purified 6FK from this material. As noted above, any hydrate between one and three may be disassociated by heat treatment. Trihydrate, produced by the disassociation reaction, may be recycled as make-up for a continuous type operation.

All of the foregoing product and process features discussed in detail in connection with 6FK are applicable in the same way to 5FK, the only appreciable differences for consideration being the 26.0–26.5 M.P. of $5FK \cdot H_2O$ and the minus 5° C. M.P. of $5FK \cdot 3H_2O$.

The following illustrate practices of the invention.

EXAMPLE 1

Apparatus employed included a single-necked flask provided with a magnetic stirrer, and at the top of the neck with a Dry Ice-acetone cold finger. Incoming reactants charged consisted of water and 6FK. About 92.5 g. (5.144 m.) of water were introduced into the flask. With constant stirring of the flask contents, vaporous 6FK was fed into the cold finger in which 6FK condensed and then dropped as liquid into the water. During a period of about 6 hrs., about 577 g. (3.48 m.) of 6FK were thus fed into the flask, and were absorbed in the water. During addition of the 6FK, the contents of the flask warmed up to about 40° C. At this stage, the flask contained about 680 g. of liquid material, and mole ratio of 6FK to $H_2O$ of such material was about 1:1.48. The contents of the flask were split into two approximately equal increments each containing about 1.74 m. of 6FK and about 2.57 m. of $H_2O$. To a first increment of about 344 g. in a suitable flask equipped with a cold finger, an additional 157 g. (0.95 m.) of 6FK were added in the manner described above, at which point no more 6FK was absorbed. Temperature in the flask was about 15–30° C. Contents of the flask comprised a slightly moist mass composed of long, needle-like white solid crystals containing 6FK and $H_2O$ constituents in mole ratio of about 2.69 to about 2.57, and having a melting point of about 40° C., and constituting the monohydrate, $6FK \cdot H_2O$. The neck of the flask was connected to a distillation column having a cooled head. On heating the contents of the flask gradually up to a pot temperature at a little below about 105° C., the solids melted at about 40° C. and there was distilled over a gas which, when condensed in a Dry Ice trap, amounted to about 196 g. (1.18 m.) of water-white liquid. The gas discharged from the distillation column during distillation was subjected ---
[1] Liquid $6FK \cdot H_2O$ refers to solid $6FK \cdot H_2O$ which is associated with an excess of $H_2O$ not exceeding an additional two moles of water, i.e. $6FK \cdot >1<3H_2O$. Solid $6FK \cdot H_2O$ with small additional amounts of water forms slurries while solid $6FK \cdot H_2O$ with up to two moles of additional $H_2O$ becomes increasingly more liquid in nature. If a total of three moles of $H_2O$ are provided, of course, the trihydrate will be formed. Both the solid and liquid monohydrates may be disassociated to the corresponding trihydrates and FK.

to infrared analysis which showed the C=O group and otherwise the known pattern of 6FK. Condensate, resulting from cooling of the gas, was distilled in a separate operation and found to have the minus 27° C. B.P. of anhydrous 6FK.

When discharge of gas, identified to be 6FK, from the top of the distillation column ceased, the latter was put on reflux maintained at 105° C. On take-off of product from the column, temperature including pot temperature remained at about 105° C. over the entire distillation operation to a substantially dry and empty pot. During distillation there was produced an off-gas which when condensed at about room temperature amounted to about 146 g. (0.65 m.) of water-white liquid. The latter was analyzed by nuclear magnetic resonance and was found to contain 52.95% (by weight) of fluorine and 2.68% of hydrogen, corresponding theoretical values for 6FK·3H$_2$O being 51.8% and 2.73%. The found values indicate about 71.1% 6FK and 24.1% H$_2$O as compared with theory values of about 75.5% and 24.5% respectively. In the formula 6FK·$x$H$_2$O, $x$ calculated on the basis of hydrogen analytical result equals 2.92 m., and $x$ calculated on the basis of the fluorine result equals 2.73 m. Infrared absorption spectrum showed the presence of fluorine atoms and the presence of a hydroxyl group. Phase studies of this material showed that it was not a true compound, but a constant boiling composition corresponding to CF$_3$COCF$_3$·3H$_2$O. Further, 6FK was quantitatively recovered from this material by distilling a sample of it in the presence of concentrated sulfuric acid. Accordingly, on heating, the substantially solid crystalline monohydrate, 6FK·H$_2$O, disassociated to 6FK and a water-white liquid having a boiling point of about 105° C. The liquid is miscible with water in all proportions, and other tests on it show a specific gravity at 25° C. of about 1.6. The liquid was identified as being 6FK·3H$_2$O.

EXAMPLE 2

To the second increment of Example 1, i.e, about 336 g. of liquid material containing about 1.74 m. of 6FK and about 2.57 m. of H$_2$O, at room temperature, there was added about 46 g. (2.56 m.) of water. The result was a water-white liquid containing 6FK and H$_2$O constituents in mole ratio of about 1.74 to about 5.13, i.e. 6FK and H$_2$O constituents corresponding to the trihydrate, 6FK·3H$_2$O. This liquor was distilled and boiled constantly to a substantially dry and empty pot at about 105° C., thus showing the liquid distilled to be the same as the pot residue distilled at about 105° C. constant boiling temperature in Example 1. Comparative infrared analyses of the distillates of Examples 1 and 2 showed the products to be the same, i.e., 6FK·3H$_2$O. 6FK is quantitatively recovered from the 6FK·3H$_2$O product by desiccation with conc. H$_2$SO$_4$ (80%) at temperatures in the range of about −27° C. to plus 150° C.

EXAMPLE 3

About 195 g. of 5FK were condensed into a flask cooled in a Dry Ice-acetone slush. About 18 g. of water were added gradually to the 5FK. On completion of water addition, during which temperature was a little above zero, there was formed in the flask a slightly moist mass composed of white solid crystals containing 5FK and H$_2$O constitutents in mole ratio of 1.07 to one, i.e, corresponding substantially to the monohydrate,

5FK·H$_2$O

This material was found to have a melting point of 26.0–26.5° C. The neck of the flask was connected to a distillation column having a cooled head. On heating up the flask contents to a little below about 105° C., the solids melted at a little above 26–27° C., and there was distilled over a gas which, when condensed in a Dry-Ice trap, amounted to about 112 g. of water-white liquid. Infrared analysis of the latter showed the C=O group and otherwise known pattern of 5FK, and the material boiled at the plus 8° C. B.P. of anhydrous 5FK. When discharge of gas from the top of the distillation column ceased, the latter was put on reflux maintained at about 105–106° C. On take-off of further vaporous product from the column, temperature including pot temperature remained at about 105–106° C. during distillation to a substantially dry and empty pot. In the course of distillation, there was produced an off-gas which, when condensed to about room temperature, amounted to about 81 g. of water-white liquid. On the basis that initial addition of water to the 5FK formed 5FK·H$_2$O, and that during heating and distillation of the solid material the 5FK·H$_2$O was disassociated to 5FK and 5FK·3H$_2$O, recovery of 112 g. of 5FK compares with theoretical 121 g. recovery of 5FK, indicating a ketone loss. On basis of the water charged, the 105–106° C. constant boiling liquor was 5FK·2.8H$_2$O. Instrumental NMR analysis of the constant boiling liquor for fluorine showed 39.8% by weight as compared with the 40.2% theory for

5FK·3H$_2$O

Based on the material balance, fluorine analysis and 3H$_2$O. Based on material balance, fluorine analysis and constant boiling characteristic, the final condensate was established to be 5FK·3H$_2$O. 5FK is quantitatively recovered from the 5FK·3H$_2$O produced by desiccation with conc. H$_2$SO$_4$ (98%) at temperatures in the range of about 60–80° C.

EXAMPLE 4

About 36 g. (2.0 m.) of water and about 400 g. (2.2 m.) of 5FK were incorporated and reacted in substantially the same manner as in Example 3. There was formed in the flask a slightly moist mass of solid crystals, substantially the same as in Example 3, having M.P. of about 26° C. and containing 5FK and H$_2$O constituents in mole ratio of about 1.1:1, corresponding substantially to 5FK·H$_2$O. This mass was subjected to heating and distillation by procedure substantially the same as in Example 3, and there were recovered about 260.8 g. of material boiling at plus 8° C., i.e., 5FK, and about 163 g. of material boiling at 105.5° C. During recovery of the approximate 105° C. fraction, pot temperature stayed constantly at about 105° C., the material was stable throughout distillation, and distillation was carried to a substantially dry and empy pot. On the basis of water and 5FK initially charged, the 261 g. of 8° C. fraction recovered compares with about 279 g. theory recovery of 5FK. 5FK is quantitatively recovered from a sample of the 5FK·H$_2$O product by desiccating the sample with P$_2$O$_5$ at temperatures in the range of about 60–80° C. Accordingly on heating, the substantially solid crystalline monohydrate (5FK·H$_2$O), formed by incorporation of substantially equimolecular amounts of H$_2$O and 5FK, disassociated to 5FK and 5FK·3H$_2$O. Under normal conditions the latter is a water-white liquid having a constant boiling point of 105–106° C. The trihydrate is miscible with water in all proportions, and other tests show a specific gravity at 25° C. of about 1.63.

EXAMPLE 5

At about room temperature, 20.5 g. of water were added to 72.5 g. of the 105° C. constant boiling 5FK·3H$_2$O product of Example 4. The resulting liquor was fractionally distilled to a substantially dry and empty pot, and there were recovered about 21.5 g. of a fraction boiling at 100° C. mostly water, 4.5 g. of an intermediate boiling in the range of 100° C. to a little below 105° C., and 68 g. of material boiling at about 105° C. Pot temperature remained constant at about 105° C. during distillation of the 105° C. fraction. This run demonstrates the constant boiling characteristics of 5FK·3H$_2$O and separability of the same from water.

EXAMPLE 6

About 23.5 g. (0.1 m.) of the 105° C. B.P. 5FK·3H$_2$O product of Example 4 was introduced into a flask cooled in wet ice. About 41 g. (0.23 m.) of gaseous 5FK were bubbled into the liquid trihydrate. On cessation of feed of 5FK, the contents of the flask comprised a slightly moist mass, substantially the same as in Example 4, containing 5FK and H$_2$O constituents in mole ratio of 0.33:0.30. The resulting mass was heated gently at less than about 30° C., and there were vaporized off and recovered about 7.5 g. of material identified by infrared to be 5FK. The residue recovered in the flask was a relatively dry white crystalline solid material in amount of 57 g. corresponding to about 60 g. of 5FK·H$_2$O theoretically recoverable as 5FK·H$_2$O. Melting point of the solid material was determined to be about 26.5° C. 5FK is recovered from the 5FK·H$_2$O by scrubbing with SO$_3$.

In the following examples, discrepancies in Cl$^-$ and F$^-$ balance are within expected and acceptable limits of normal experimental error.

EXAMPLE 7

6FK was bubbled into a test tube containing 4.6 g. of conc. HCl (assay 38%) until a white solid was formed. The white solid comprised 6FK·H$_2$O (M.P. 40° C.). (Source of liquid-phase water was the 38% assay HCl.) The total weight of the white solid in the tube was 22.4 g. The 22.4 g. of white solid were dissolved in water and a Volhard chloride determination was carried out on the resulting solution. The Volhard chloride determination required a total of 2.4 ml. of 0.1 N AgNO$_3$. This was equivalent to 0.0086 g. HCl, showing that better than 99% of the HCl had left the system. This experiment shows that 6FK preferentially associates with H$_2$O in the presence of HCl and that HCl is evolved from such a system.

EXAMPLE 8

Apparatus consisted of two polypropylene tubes 1¼" I.D. x 6", connected with polyethylene tubing. The first tube contained 6FK·3H$_2$O with the polyethylene tubing inserted below the surface of the 6FK·3H$_2$O and in proximity to the bottom of the tube. The second tube contained water with the polyethylene tubing positioned just above the surface of the water. An HCl contaminated 6FK sample was prepared by bubbling conc. HCl (assay 38%) into pure 6FK at a temperature below the boiling point of 6FK (below about −27.4° C.). A total of 53 g. of such a sample (containing 1.79 g. of Cl$^-$) was charged to the first tube. An exothermic reaction took place, and over a two hour period temperatures in the tube rose to about 48° C. At the end of this period, the first tube contained a whitish slurry, indicating the presence of 6FK·H$_2$O in a slight excess of water. The first and second tubes were then analyzed for Cl$^-$. 1.07 g. of Cl$^-$ were found in the first tube and 0.78 g. of Cl$^-$ were found in the second tube. These data show that about 43% of the HCl associated with the 6FK in the contaminated 6FK sample was evolved off during the course of formation of 6FK·H$_2$O plus a slight excess of H$_2$O.

EXAMPLE 9

The procedure of Example 8 was repeated excepting that enough of an HCl contaminated 6FK sample was charged to the first tube containing 6FK·3H$_2$O, so as to completely form the solid 6FK monohydrate. 80.7 g. of HCl contaminated sample, 6FK containing 1.9 g. of Cl$^-$, were required to accomplish this and the run took 2½ hours with the temperatures reaching 50° C. The condition of the material in the first tube was that of a white crystalline solid. The quantities of Cl$^-$ recovered in the first and second tubes were 0.14 g. and 0.96 g., respectively. These data show that about 50.5% of the HCl associated with the 6FK was evolved off during the course of the formation of 6FK·H$_2$O.

EXAMPLE 10

The procedure of Example 9 was repeated, excepting that at the end of the run the 6FK·H$_2$O reaction mass in the first tube was purged with dry nitrogen for a period of one hour. 104 g. of HCl contaminated 6FK sample, containing 1.98 g. of Cl$^-$, were required to completely form 6FK·H$_2$O in this run. The quantities of Cl$^-$ recovered in the first and second tubes, after the nitrogen purge, were .011 g. and 2.1 g., respectively. These data show that essentially all (100%) of the HCl associated with the 6FK was removed by the combined procedure of forming 6FK·H$_2$O and purging the solid 6FK·H$_2$O with nitrogen.

EXAMPLE 11

The procedure of Example 10 was repeated, excepting that the 6FK·H$_2$O formed was subjected to vacuum pumping, for 15 minutes, in lieu of the nitrogen purging. 54 g. of HCl contaminated 6FK sample, containing 1.16 g. Cl$^-$, were required to form the 6FK·H$_2$O in this run. The quantities of Cl$^-$ recovered in the first and second tubes, after the vacuum pumping, were 0.002 g. and 1.2 g., respectively. These data show that essentially all (100%) of the HCl associated with the 6FK was removed by the combined procedure of forming 6FK·H$_2$O and subjecting the 6FK·H$_2$O to vacuum pumping.

EXAMPLE 12

The procedure of Example 11 was repeated, excepting that an HF contaminated 6FK sample was used as the charge to the first tube containing 6FK·3H$_2$O. 65 g. of HF contaminated 6FK sample, containing 1.8 g. F$^-$, were required to form the 6FK·H$_2$O. The quantities of F$^-$ recovered in the first and second tubes, after the vacuum pumping, were 1.34 g. and 0.21 g., respectively. These data show that about 12% of the HF associated with the 6FK was removed by the combined procedure of forming 6FK·H$_2$O and subjecting the 6FK·H$_2$O to vacuum pumping.

EXAMPLE 13

The procedure of Example 12 was repeated, excepting that an HF contaminated 5FK sample was substituted for the HF contaminated 6FK sample, and there was no vacuum pumping. 77 g. of HF contaminated 5FK sample, containing 1.92 g. of F$^-$, were required to form the 5FK·H$_2$O. The quantities of F$^-$ recovered in the first and second tubes were 1.38 g. and 0.28 g., respectively. These data show that about 15% of the HF associated with the 5FK was evolved off during the formation of 5FK·H$_2$O.

We claim:
1. The process for purifying a perhaloacetone selected from the group consisting of hexafluoroacetone, monochloropentafluoroacetone and mixtures thereof, from a crude reaction mass containing the same, together with impurities, which comprises the steps of:
   (a) contacting the crude reaction mass with liquid-phase water in amount equivalent to at least one mole of H$_2$O per mole of perhaloacetone, while maintaining temperature such that any free water present is in liquid phase, to form a purified reaction mass comprising recoverable perhaloacetone·$x$H$_2$O, wherein $x$ is a whole number from one to three,
   (b) eliminating at least a portion of said H$_2$O from the purified reaction mass, and
   (c) recovering anhydrous, purified perhaloacetone.
2. The process of claim 1 in which the perhaloacetone is hexafluoroacetone.
3. The process of claim 1 in which the perhaloacetone is monochloropentafluoroacetone.
4. The process of claim 1 in which the perhaloacetone is a mixture of hexafluoroacetone and monochloropentafluoroacetone and in which the anhydrous, purified perhaloacetone is recovered from the reaction mass by fractional distillation.

5. The process of claim 1 in which the temperature, at which the crude reaction mass is contacted with the liquid-phase water, is maintained substantially in the range of 5–80° C.

6. The process of claim 1 in which the purified reaction mass comprises perhaloacetone·2H$_2$O.

7. The process of claim 1 in which $x$ is a whole odd number from one to three.

8. The process of claim 1 in which the purified reaction mass comprises perhaloacetone·H$_2$O.

9. The process of claim 1 in which the purified reaction mass comprises perhaloacetone·3H$_2$O.

10. The process of claim 1 in which the purified reaction mass is heated to volatilize therefrom volatile constituents which boil below about 105° C. at atmospheric pressure.

11. The process of claim 1 in which the purified reaction mass comprises perhaloacetone·H$_2$O and in which the purified reaction mass is heated to volatilize therefrom volatile constituents which boil below about 105° C. at atmospheric pressure and at the same time eliminate at least a portion of said H$_2$O from the purified reaction mass thereby forming perhaloacetone·3H$_2$O boiling constantly at about 105° C. at atmospheric pressure and evolving off anhydrous purified perhaloacetone.

12. The process of claim 1 in which the purified reaction mass comprises perhaloacetone·3H$_2$O and in which the purified reaction mass is heated to volatilize therefrom volatile constituents which boil below about 105° C. at atmospheric pressure.

13. The process of claim 1 in which elimination of H$_2$O from the purified reaction mass is effected by use of a desiccating agent selected from the group consisting of conc. H$_2$SO$_4$, P$_2$O$_5$ and SO$_3$.

14. The process of claim 1 in which the purified reaction mass comprises perhaloacetone·3H$_2$O, in which the purified reaction mass is heated to volatilize therefrom volatile constituents which boil below about 105° C. at atmospheric pressure and in which elimination of H$_2$O from the heated purified reaction mass is effected by dehydrating with conc. H$_2$SO$_4$.

15. The process of claim 1 in which the purified reaction mass comprises perhaloacetone·H$_2$O, in which the purified reaction mass is heated to volatilize therefrom volatile constituents which boil below about 105 C. at atmospheric pressure and at the same time eliminate at least a portion of said H$_2$O from the purified reaction mass, thereby forming perhaloacetone·3H$_2$O boiling constantly at about 105° C. at atmospheric pressure and evolving off anhydrous purified perhaloacetone, in which process water is eliminated from the perhaloacetone·3H$_2$O which is formed by dehydration with conc. H$_2$SO$_4$.

16. The process of claim 1 in which:
 (a) the temperature at which the crude reaction mass is contacted with the liquid-phase water is maintained substantially in the range of 5–80° C.;
 (b) the purified reaction mass comprises perhaloacetone·$x$H$_2$O, wherein $x$ is a whole odd number from one to three, and in which
 (c) the purified reaction mass is heated to volatilize therefrom volatile constituents which boil below about 105° C. at atmospheric pressure.

17. The process of claim 16 in which $x$ is three and in which water is eliminated from the purified reaction mass by dehydration with conc. H$_2$SO$_4$.

18. The process of claim 16 in which $x$ is one and in which, upon heating the purified reaction mass, there is formed perhaloacetone·3H$_2$O and evolved off anhydrous perhaloacetone.

19. The process of claim 16 in which the perhaloacetone is hexafluoroacetone.

20. The process of claim 16 in which the perhaloacetone is monochloropentafluoroacetone.

21. The process of claim 16 in which the perhaloacetone comprises a mixture of hexafluoroacetone and monochloropentafluoroacetone and in which the anhydrous, purified perhaloacetone is separated from the reaction mass by fractional distillation.

22. The process of claim 16 in which $x$ is one in which perhaloacetone·3H$_2$O is formed and anhydrous, purified perhaloacetone is evolved off by the heat treatment of the purified reaction mass and in which water is eliminated from the thusly formed perhaloacetone·3H$_2$O by dehydration with conc. H$_2$SO$_4$.

References Cited

UNITED STATES PATENTS 2,617,836   11/1952   Pearlson et al.

FOREIGN PATENTS 588,111   12/1959   Canada.

OTHER REFERENCES

Henne, J. Am. Chem. Soc. 72, 3578 (1950).

DANIEL D. HORWITZ, *Primary Examiner.*